United States Patent [19]

Barrett et al.

[11] Patent Number: 5,863,581
[45] Date of Patent: Jan. 26, 1999

[54] TEA PROCESSING WITH ZEOLITES

[75] Inventors: Matthew John Barrett, Bedford; Mark Richard Birch; Timothy Graham Jones, both of Rushden, all of United Kingdom

[73] Assignee: Lipton, Division of Conopco, Inc., Englewood Cliffs, N.J.

[21] Appl. No.: 842,152

[22] Filed: Apr. 23, 1997

[30] Foreign Application Priority Data

Apr. 25, 1996 [EP] European Pat. Off. .............. 96302893

[51] Int. Cl.$^6$ ................ A23L 1/77; A23B 7/10; A23F 3/00
[52] U.S. Cl. .................... 426/250; 426/49; 426/262; 426/597
[58] Field of Search .................... 426/250, 262, 426/264, 597, 49

[56] References Cited

U.S. PATENT DOCUMENTS

| | | | |
|---|---|---|---|
| 4,051,264 | 9/1977 | Sanderson et al. | 426/52 |
| 4,135,001 | 1/1979 | Edmonds et al. | 426/250 |

FOREIGN PATENT DOCUMENTS

| | | |
|---|---|---|
| 2047500 | 1/1993 | Canada . |
| 0013451 | 7/1980 | European Pat. Off. . |
| 0042294 | 12/1981 | European Pat. Off. . |
| 2 160 982 | 7/1973 | France . |
| 61 074 527 | 4/1986 | Japan . |
| 63-24850 | 2/1988 | Japan . |
| 04 049 277 | 2/1992 | Japan . |
| 07 313 580 | 12/1995 | Japan . |
| 1342470 | 11/1985 | U.S.S.R. . |
| 1382896 | 2/1975 | United Kingdom . |

OTHER PUBLICATIONS

Database Abstract. AN: 95–207527 [28] WPIDS for CN 1086105. Assignee: Guangxi College Traditional Chinese, May 1994.
Database Abstract. AN 78(08):H1014 FSTA for Kaffee und Tee Markt, 26(18), pp. 3–6. Author: Wurziger, 1976.
Database Abstract. AN 84(04):H0910 FSTA for Alimentos, 8 (2), pp. 9–12 and 14. Authors: Dondero et al (1983).
Database Abstract. AN 95–040250 [06] WPIDS for JP 06319453. Assignee: Kane. 1994.
Patent Abstracts of Japan. Abs. C508, vol. 12, No. 230 for JP 63–24850. Inventor: Sakamoto, May 1988.
Abstract of SU 1342470.
*European Search Report* in European Patent Application No. 96 30 2893 dated Oct. 11, 1996 is enclosed.
Derwent abstract of T. Mgaloblishvili et al. "Effects of Chelates and Clinoptilolite–richTuffs on BiochemicalIndexes of Tea Leaf Quality", vol. 108, No. 13, 29 Mar. 1998.

*Primary Examiner*—Anthony J. Weier
*Attorney, Agent, or Firm*—James J. Farrell

[57] ABSTRACT

Tea products, particularly black leaf tea and tea powder, derived from green tea leaf are manufactured by a process involving addition of zeolite, preferably a synthetic sodium or potassium zeolite, for reaction with tea ingredients present or subsequently produced to generate red colour species. The tea products produce beverages having enhanced colour characteristics, in terms of colour properties and speed of colour generation, compared with conventional products.

11 Claims, 4 Drawing Sheets

TEA PROCESSING WITH ZEOLITES

FIELD OF THE INVENTION

This invention relates to tea processing and concerns a method of manufacturing a tea product (particularly black leaf tea and tea powder) derived from green tea leaf wherein zeolite is used to generate red colour species. The invention also concerns tea products and beverages produced from such tea products.

BACKGROUND TO THE INVENTION

Processing of green tea leaf to produce a variety of tea products is well known. In a typical case, freshly picked green tea leaves are allowed to wither involving mild drying for up to 24 hours, and the withered leaves are then cut up in a maceration step in which the leaves are passed through sets of CTC (crush, tear, curl) rollers that shred the leaves. The shredded leaves are subjected to a fermentation step for about 2 hours, during which enzymic oxidation takes place and the leaves change colour from green to brown as a result of conversion of colourless catechins to coloured polyphenols including theaflavins (TFs) and thearubigens (TRs). The product is then dried in a fluidized bed in a firing stage, resulting in production of black leaf tea which is sorted and graded. The black leaf tea may then be used in conventional manner, by infusion in water (usually hot) to produce a red-brown coloured beverage.

The black leaf tea may alternatively be further processed to produce tea powders with specific desired properties such as solubility in cold water, clarity, colour and taste. A typical use of such powder is as an ingredient in an instant tea powder mix. Alternatively, the tea powder may be used to produce tea based soft drink beverages such as those sold under the Trade Mark LIPTONICE.

As a further possibility, tea powder may be produced from green tea leaf by a slurry fermentation process. Green tea leaf is macerated by passage through sets of CTC rollers and then slurried in water to produce a dilute slurry of macerated tea leaf. The slurry is fermented at a temperature of about 25° C. by bubbling air or oxygen through the slurry for a suitable time. The resulting product undergoes a deleafing process in which insoluble material is removed and discarded, leaving a pale coloured solution of tea solids. The solution is concentrated, polished and freeze or spray dried to produce water soluble tea powder.

An important consideration in tea processing is the colour of the ultimate tea or tea-based beverage to be drunk by a consumer, it being desirable for the beverage to be clear and have a bright red-yellow colour so that the beverage looks attractive.

The present inventors have surprisingly discovered that use of zeolites in the manufacture of tea products has a desirable effect on the colour of tea beverages produced therefrom.

Zeolites are a large family of aluminosilicate minerals (both natural and synthetic) having a negatively charged framework structure with cavities housing cations typically of one or more alkali or alkaline earth metals such as sodium, potassium, magnesium, calcium and barium. The general formula of zeolites is:

$$M_x[(AlO_2)_x(SiO_2)_y]_n \cdot wH_2O$$

where:

n=valence of cation or cations M w=number of water molecules per unit cell x and y=total number of tetrahedra per cell It is known to use zeolites, particularly zeolite Y, for decaffeination purposes. See, for example, EP 0013451 (Union Carbide), EP 0042294 (General Foods) and CA 2047500 (Jacobs Suchard).

SU 1342470 (Georgian Institute of Subtropical Industries) describes drying of tea leaves for black tea production in which drying air is first passed through a layer of zeolite before being passed up through a layer of green leaves, with the aim of reducing the humidity of the air to shorten drying times. Subsequent processing is conventional. The zeolite does not contact the leaves, and has no direct involvement in tea processing reactions.

JP 63-24850 (Soft Silica KK) describes use of zeolite, particularly soft porous silicate China clay, in processing of green tea with the aim of removing contaminating ions. Zeolite powder or supernatant liquid obtained by mixing zeolite with water is added to fresh leaf prior to or during the steaming stage of production of green tea. This results in production of tea with improved aroma, taste and colour. Green tea production does not involve production of the red/brown colours appropriate to black tea products.

It is also known from JP 04-330908 (Shinozaki) to incorporate calcined zeolite in filter paper, with the aim of eliminating filter paper odour and dissolved filter paper microparticles. Such zeolite-containing filter paper may be used as material for a tea bag containing black tea.

UK patent specification GB 1,382,896 (The Procter & Gamble Company) discloses a method of carbonating aqueous beverages that involves using crystalline aluminosilicates containing gaseous carbon dioxide as a "molecular siever".

However the present invenors are not aware of any prior disclosure of use of zeolites in the manufacture of tea products to generate red colour species.

SUMMARY OF THE INVENTION

In one aspect, the present invention provides a method of manufacturing a tea product derived from green tea leaf, characterised by addition of zeolite to green leaf or green leaf-derived material during tea product manufacture for reaction with tea ingredients present or subsequently produced to generate red colour species.

Experiments indicate that zeolite can be added at any convenient stage during tea product manufacture, eg during processing as outlined above.

For example, zeolite can be added during manufacture of black tea from green leaf. Zeolite is preferably added before or during the fermentation stage, more preferably immediately before the last CTC stage.

In a preferred aspect the invention thus provides a method of manufacturing black tea from green tea leaf, wherein zeolite is added to green leaves prior to or during fermentation.

The resulting black tea is found on infusion to produce a beverage having enhanced colour characteristics compared with a beverage from a similarly produced black tea without zeolite addition. Furthermore, the zeolite treated product develops desirable colour characteristics on infusion more rapidly than would otherwise be the case, even when infused with cold water rather than hot water. The invention can thus provide a fast infusing and/or cold water infusing black leaf tea.

The resulting black tea may optionally be further processed, eg as outlined above, to produce tea powder (hot or cold water soluble) that is also found to have enhanced colour generation properties.

Zeolite can alternatively be added during manufacture of tea powder (hot or cold water soluble) from green leaf. Zeolite is preferably added before or during the slurry fermentation stage.

In another preferred aspect the invention provides a method of manufacturing tea powder from green tea leaf, wherein zeolite is added to green leaves prior to or during slurry fermentation.

Another approach is to add zeolite during processing of black leaf tea to produce tea powder (hot or cold water soluble), for example as described above.

Zeolite may, as a further possibility, be added during a black and/or green tea extraction process for manufacture of tea powder (hot or cold water soluble). Such processes conventionally involve mixing green and/or black tea leaf with water and subjecting the mixture to a hot water extraction process at a temperature exceeding 50° C. with addition of further water. Enzyme treatment with tannase and other enzymes may optionally be carried out prior to extraction. After extraction, the material undergoes deleafing, concentrating, polishing and freeze or spray drying steps, to produce a water soluble tea powder. In this case, zeolite in preferably added prior to the hot water extraction stage.

The invention results in production of tea powder (hot or cold water soluble) that has enhanced colour characteristics on addition of water compared with conventionally produced tea powders. The colour is also found to be acid stable and is not significantly affected at pH of 4 or lower, unlike the colour produced by some conventional tea powders.

The tea powder may be used as an ingredient in an instant tea powder mix or a tea-based soft drink.

Without wishing to be bound by theory, it is thought that zeolites act to promote production of desirable red colour species by their effect in raising pH and causing metal ion exchange.

It is preferred to use synthetic zeolites for reasons of purity and consistency.

It is also preferred to use zeolites having a relatively high ratio of aluminium to silicon, and consequently having high metal ion exchange capacity, with the ratio of Si:Al preferably being 2:1 (ie y=2x in the general formula above) or less, and with the Si:Al ratio more preferably being 1:1 (x=y).

Preferred zeolites include zeolite A, which has the general formula $M_{12}[(AlO_2)_{12}(SiO_2)_{12}]_n \cdot w\ H_2O$, ie Si:Al=1:1. Forms of zeolite A include the sodium form, which has cages or pores with a diameter of 4Å (this is known as zeolite A), and has the formula $Na_{12}[(AlO_2)_{12}\ (SiO_2)_{12}]\cdot 27\ H_2O$. Zeolite 4A (with sodium ions) is commerically available under the Trade Names WESSALITH P (from Degussa) and DOUCIL P (from Crosfield).

Other forms of zeolite A include:

Zeolite 3A=K form (less voidages, 3Å diameter cages)

Zeolite 5A=Ca form (fewer cages due to divalent cation, 5Å diameter cages).

CG180 (from Crosfield) is a sodium analogue of zeolite 3A, having sodium ions in 3A diameter cages.

It is believed that sodium zeolites can suppress astringency and bitterness in tea based beverages. However those characteristics are perceived by some consumers as being important contributors to the character of tea. It may be desireable to use a potassium zeolite instead, particularly a 3A potasssium zeolite, which typically does not have the same suppressing effects. Magnesium and calcium zeolites do not seem to significantly suppress astringency and bitterness but they tend to generate fewer red colour species colour than that sodium or potassium zeolites. Consequently, a mixture of zeolites may be used to cater to a variety of colour and taste preferences.

It is found that addition of even small amounts of zeolite can have a significant effect on the colour of beverages obtained from the tea products, with increasing amounts of zeolite having an increasing effect on colour until a plateau or saturation effect occurs. Zeolite is suitably added at a level as low as about 0.05% zeolite by weight based on initial dry weight of tea leaf. The zeolite can be regarded as a process aid.

The tea manufacture methods of the invention are preferably carried out in such a way as to promote generation of theaflavins, as this results in enhanced colour effects. Various techniques for increasing theaflavin levels are known to those skilled in the part. A preferred approach is to use an acyl-hydrolase such as tannase or Teazyme C prior to fermentation to cause degallation and thereby increase theaflavin levels. Further, it is known that different varieties of tea produce varying levels of theaflavins, so high theaflavin-producing tea varieties can be used to advantage.

The present invention can thus enable production of tea products, particularly black leaf tea and tea powders (hot and cold water soluble), that produce beverages (including tea based soft drinks) that have enhanced colour characteristics as compared with conventionally produced products. The invention can also promote production of cold water soluble colour species, leading to the possibility of fast infusing and/or cold infusing tea products.

The invention also includes within its scope tea products and beverages, particularly black leaf tea, tea powders, instant tea powder mixes and tea-based soft drinks, produced by a method of the invention, including beverages having a (final) pH of 4 or lower. Tea based beverages, particularly ready to drink tea products, preferably have a pH between 3 and 4 to maximise taste and colour stability.

In another aspect the invention covers use of zeolite to produce red colour species in tea products and tea beverages.

The invention will now be further described, by way of illustration, in the following Examples and with reference to the accompanying drawings, in which:

EXAMPLE 1

Black Tea Powder Produced by Slurry Fermentation

Figure 1:
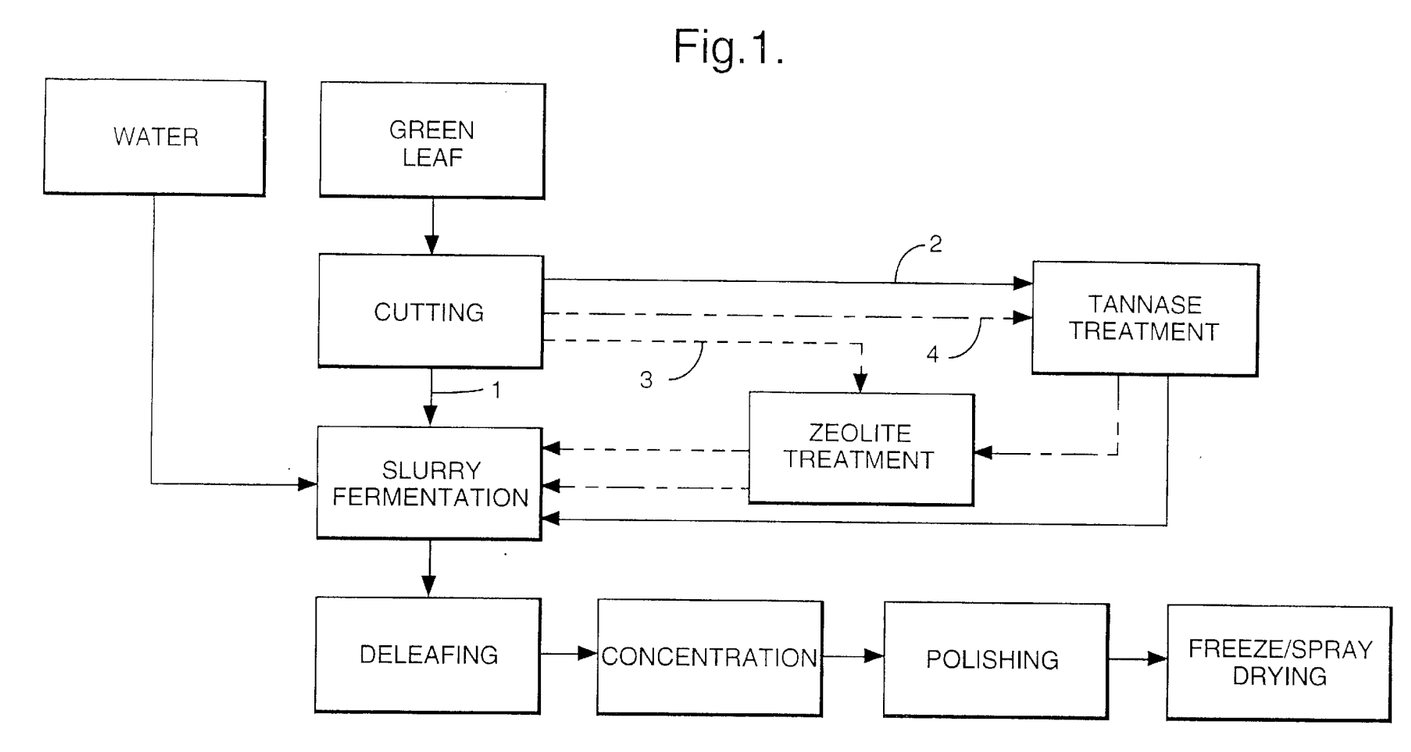
FIG. 1 is a flow chart illustrating a slurry fermentation process for manufacture of tea powder from green leaf.

Referring to FIG. 1, a conventional slurry fermentation process for production of tea powder from green leaf comprises cutting, slurry fermentation, deleafing, concentration, polishing and freeze or spray drying steps. In accordance with the invention, in this example zeolite is added prior to the slurry fermentation step. Tannase is preferably also added prior the slurry fermentation step, before zeolite addition.

Experiments were carried out using green leaf from Kenyan tea clones. All two leaves and a bud were picked and used fresh (ie no withering, freezing etc). The fresh leaf was plucked and then passed through a CTC (cut, tear, curl) machine to produce dhool (macerated, unfermented green leaf) which was then used for the following experiments.

In a control expermiment 40.7 ml of distilled/deionised water was placed into a 250 ml shake flask. To this 11.9 g of dhool was added (making a 5% solution dry basis). This solution was placed on a shake flask and aerated and mixed at 25° C. at 200 rpm for 75 minutes. The solution was then deleafed by passing it through a 180 μm sieve.

The deleafed liquor was placed for 30 minutes at 4° C. then centrifuged (de-creamed) at 12,000 g at 4° C. for 25 minutes.

The above expermient was then repeated, with conditions indentical to the control except that 0.5 g of zeolite 4A (WESSALITH P) was added to the water in the shake flask.

This is approximately equivalent to 1 g of zeolite to 5 g of black tea leaf. Thus zeolite was present during fermentation. All zeolite was removed during the de-creaming phase.

The % cold soluble tea solids (% CSS) was measured on the de-creamed liquor. The HunterLab UltraScan XE was used to measure colour using the CIE Lab scale (2° C. observer, illuminant C & 1 cm pathlength). Colour is measured and represented by three colour dimensions, L,a and b. L represents paleness/darkness, with L=0 being black and L=100 being white or colourless. a represents redness/greeness, with high positive values of a being red and high negative values of a being green. b represents blueness/yellowness, with high positive values of b being yellow and high negative values of b being blue.

The L*a*b values for the de-creamed solution were taken and this solution was diluted using pH 3.7 citrate/phosphate buffer to obtain colour measurements at various concentrations and hence determine the L*a*b values at 0.32% CSS (drink strength).

Results and Observations

During fermentation the slurries containing zeolite went a deep mahogany red instead of green/brown. Dilution of zeolite-treated slurries with buffer during colour measurement caused the solution to flock and some of the precipitate (and colour) to fall out. The following colour measurements were obtained.

| All at 0.32% CSS | L | a | b |
| --- | --- | --- | --- |
| Control | 91.7 | 4.8 | 73.5 |
| Zeolite addition | 70.0 | 24.0 | 92.5 |

A second series of similar experiments was carried out adding zeolite 4A (WESSALITH P) (0.3 g zeolite/0.32 g powder) to slurry fermented powders (control and tannase treated) (tannase addition was 0.0064% of weight of tea solids). This is approximately equivalent to 1 g zeolite to 3.5 of black leaf tea. Dramatic changes in colour were observed.

| | L | a | b |
| --- | --- | --- | --- |
| Control | 85 | 2 | 83 |
| Control + Tannase | 79 | 15 | 104 |
| Control + Zeolite | 60 | 28 | 80 |
| Control + T + Z | 50 | 48 | 74 |
| Control + T + Z (pH 3.7) | 61 | 35 | 83 |

The colour is somewhat unstable and some colour irreversibility is observed in the pH 3.7 citrate/phosphate buffer used. Subsequent experiments have shown that the precipitation and colour loss is less evident when using either acetic acid or a citric/citrate buffer.

EXAMPLE 2

Black Leaf Tea Produced from Green Leaf

Figure 2:
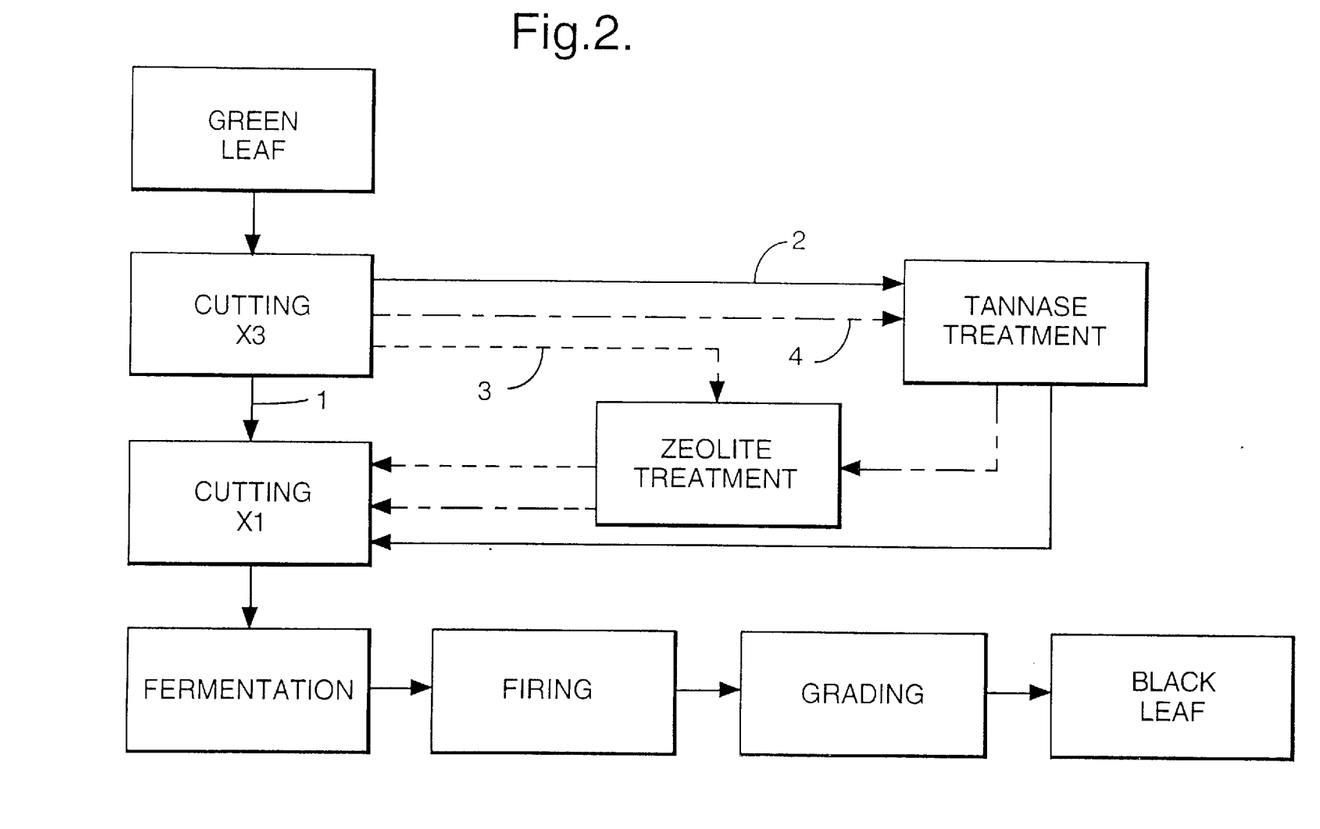
FIG. 2 is a flow chart illustrating a process for manufacture of black leaf tea from green leaf.

Referring to FIG. 2, a conventional process for manufacture of black tea from green leaf comprises 4 cutting (CTC) stages, fermentation, firing and grading steps. In accordance with the invention, in this example zeolite is added prior to the fermentation step, immediately before the final CTC stage. Tannase is preferably added during cutting, before zeolite addition.

Experiments were carried out using withered green leaf from Kenyan and Sri Lankan tea clones. Processing steps were as follows:

1. The leaf was comminuted by three successive CTC treatments.

2. The resulting dhool was spread onto a stainless steel tray and sprayed with an aqueous tannase solution. After each coverage the dhool was mixed by hand and the process repeated until all the enzyme had been applied. 10 ml of distilled water containing 2000 U of tannase was applied for each 300 g of dhool. The treated dhool was then transferred into a polythene bag and the air expelled to form a limited oxygen environment. The bag was sealed and dhool left to incubate for 30 minutes at room temperature (18° C.).

3. The dhool was spread onto a stainless steel tray and 6 grams of powdered zeolite 4A (WESSALITH P) mixed by hand until a homogenous blend was obtained. This is approximately equivalent to 1 g of zeolite to 16 g of black leaf tea.

4. The treated dhool was then passed through the CTC process a final time. This CTC pass has three possible effects:
   i) To further comminute the leaf such that the leaf size range becomes compressed around the median value. This will result in a tighter distribution of leaf particle size sieving and also help to negate experimental errors arising during infusion due to differing leaf surface areas.
   ii) To disrupt any leaf aggregates formed after the addition of water during the tannase treatment. This will result in a more efficient fermentation.
   iii) To absorb the solid zeolite into the leaf tissue. The CTC mechanism compresses the comminuted leaf like a sponge, resulting in the zeolite powder being drawn into the leaf structure as the leaf fragment expands when leaving the CTC rollers. If zeolite is added and this final CTC stage omitted, the infused product is extremely hazy due to solid, unbound, zeolite being released into the liquor from the leaf surface.

5. The treated dhool was then transferred into perforated stainless steel trays for fermentation in an environmental cabinet. The dhool was loosened to allow good aeration and incubated for 180 minutes at 95% relative humidity (RH).

6. The fermented dhool was fired for 6 minutes at 125° C. followed by 8 minutes at 80° C. in a fluid bed drier. The temperatures refer to an inlet air temperature and do not necessarily reflect the temperature of the dhool during each stage of firing.

7. The fired leaf was graded to between 1.13 mm and 0.355 mm by sieving. This was to ensure that abnormal leaf sizes such as dust and/or aggregates did not affect infusion by varying the surface area.

Summary of Experimental Manufacturing Processes

Control Samples : Steps: 1, 4, 5, 6, 7

Tannase Treated Samples: Steps: 1, 2, 4, 5, 6, 7

Zeolite Treated Samples: Steps: 1, 3, 4, 5, 6, 7

Tannase and Zeolite Treated Samples: Steps: 1, 2, 3, 4, 5, 6, 7

Infusion Methodology

All experimental results refer to the colour and properties of a cold infused liquor. The water temperature was approximately 18° C. The infusions were prepared by using the following method:

i 2.27 g of leaf tea was heat sealed into a nylon bag of tetrahedral form having sides of about 60 mm.

ii The bag was placed into a beaker containing 200 ml of distilled water and infused for 5 minutes in a quasi-static state. The infusion method was the a model of a consumer system, and consisted of the infusion being stirred 5 times immediately after adding the bag. At the end of the 5 minute period the infusion was stirred 5 more times and the bag squeezed to expel residual liquor. The spent bag was then discarded.

iii The resulting liquor was then analysed calorimetrically via transmittance on a Minolta Chroma Meter and haze readings were recorded using a DrLange instrument. The soluble solids were determined using the oven method and recorded as a percentage value.

Experimental Results

The following results (recorded in duplicate) were obtained. All treatments and measurements were carried out at the same time on the same leaf batch allowing good comparative data to be obtained.

| Sample | L-value | a-value | b-value | Haze | % Solids |
| --- | --- | --- | --- | --- | --- |
| Kenyan Control | 91.53 | −3.42 | 44.64 | 9.1 | 0.1612 |
|  | 90.93 | −3.41 | 46.18 | 10.0 | 0.1672 |
| Kenyan & Tannase | 87.65 | −2.24 | 74.08 | 10.9 | 0.2083 |
|  | 86.88 | −1.66 | 76.15 | 11.6 | 0.2174 |
| Kenyan & Zeolite | 79.52 | 8.34 | 50.39 | NR | 0.1618 |
|  | 79.24 | 8.36 | 50.28 | NR | 0.1609 |
| Kenyan & Tannase & Zeolite | 49.75 | 45.96 | 73.35 | NR | 0.2373 |
|  | 47.62 | 48.87 | 75.53 | NR | 0.2615 |
| Sri Lankan Control | 92.12 | −4.21 | 35.90 | 11.5 | 0.1595 |
|  | 92.22 | −4.33 | 36.30 | 15.1 | 0.1603 |
| Sri Lankan & Tannase | 89.80 | −5.06 | 56.60 | 15.3 | 0.2153 |
|  | 89.75 | −5.03 | 56.46 | 16.7 | 0.2127 |
| Sri Lankan & Zeolite | 82.55 | 3.51 | 34.80 | NR | 0.1608 |
|  | 83.81 | 2.96 | 33.55 | NR | 0.1546 |
| Sri Lankan & Tannase & Zeolite | 65.05 | 27.61 | 61.86 | NR | 0.2315 |
|  | 67.65 | 25.77 | 60.30 | NR | 0.2219 |

NB: Haze analysis results were not recorded as the colour intensity of the sample gave greatly elevated readings.

The results demonstrate the following trends:

a) The zeolite treatment appears to have minimal or no effect on the levels of tea solids in the infusion, or on the b-value during colour measurement. The major effects are to decrease the L-value and increase the a-value, resulting in a darker, redder, infusion.

b) Combining tannase and zeolite treatment results in an enormous increase in the colour of the infused liquor. It can be inferred that the improvements in the b-value is tannase derived, while the improvements in the L-value and the a-value are zeolite derived. This would explain why the combined effects of tannase and zeolite appears to have a greater effect than if each were used individually. An interesting point is the apparent increase in the percentage solids when both tannase and zeolite are used compared to simply adding tannase. As zeolite alone does not increase the solids level, it would be expected that this value would be equivalent to that seen for the tannase treatment, and therefore the reason for this increase remains unresolved.

c) As a final point, the behaviour of the two tea types, ie Sri Lankan and Kenyan, after addition of tannase and/or zeolite follows the same trends. The absolute differences in the values obtained demonstrates the different composition and properties of the leaf types and not differential effects of the treatments used.

Overall, the results indicate the treatment of dhool with zeolite before fermentation leads to a considerable increase in colour species generation, and results in a final infusion product which is darker and redder than an untreated control. The colour increase is greater than that seen after tannase treatment of the dhool at the same stage of the manufacture process, but unlike tannase no increase in tea solids is detectable in the infusion product.

The effects of zeolite and tannase are synergistic, with the colour of the infusion product being greater than the additive effects of tannase and zeolite when added individually. This would indicate that the oxidative mechanism of the zeolite reaction is either able to use "substrates" generated by the esterase activity of tannase to produce a more highly coloured species and/or is able to facilitate the generation of an excess of the same colour species as released by the tannase digest.

The experimental results to date indicate that the tannase and zeolite treatments can be ranked by the degree of colour generation in an infused product as follows:

Control<Tannase<<Zeolite<<<Tannase+Zeolite

EXAMPLE 3

Fast Infusing Leaf Tea

Black tea was manufactured as described in Example 2. Control black tea preparation required steps 1, 4, 5 and 6. Zeolite treatment required steps 1, 3, 4, 5 and 6. In addition both samples were graded between 0.500 mm and 0.250 mm by sieving. Teabags were made with inner dimensions of 54 mm×64 mm (equivalent to a UK teabag) using JR. Crompton 482901 heatseal paper (this being a good quality teabag paper). The bags were filled with 3.125 g (+/−0.001 g) of each of the tea samples. The resulting teabags were infused in 250 cm$^3$ freshly boiled deionised water. The teabags were subjected to two methods of infusion: (i) dynamic infusion [continual agitation simulating that of a consumer dunking]; and (ii) static infusion [the bag held vertically in the liquor simulating a pot brew].

The resulting liquor (unmilked) was pumped to a spectrophotometer and absorbance variration with time measured. The wavelength used (445 nm) correlates well to UK consumer acceptance and with solids eluted. Results are shown graphically in FIG. 3a (dynamic infusion) and FIG. 3b (static infusion), with some values being set out below.

Figure 3A:
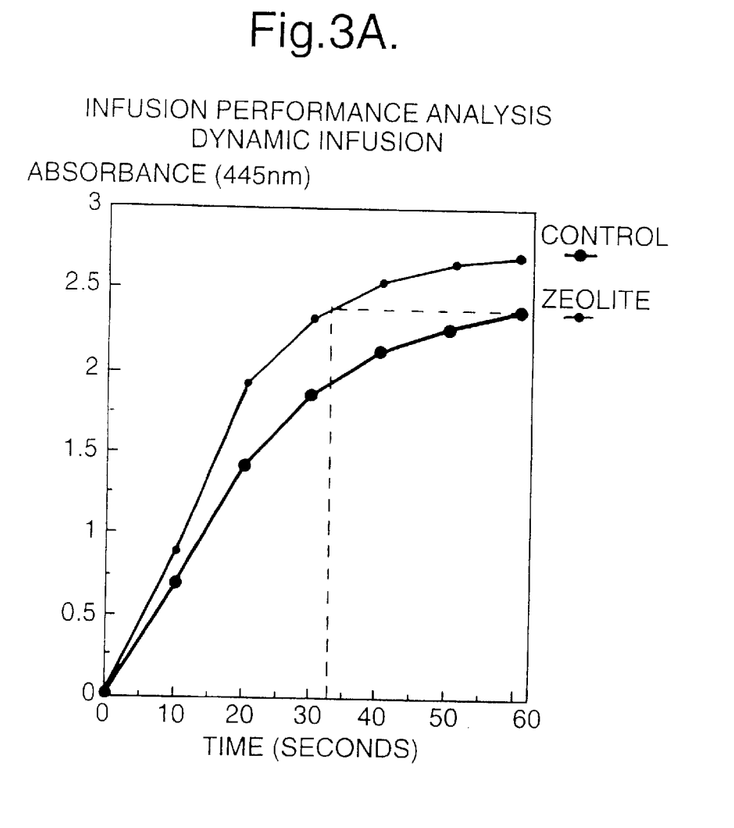
FIGS. 3a and 3b are graphs of absorbance (445 nm) versus time (seconds)
Figure 3B:
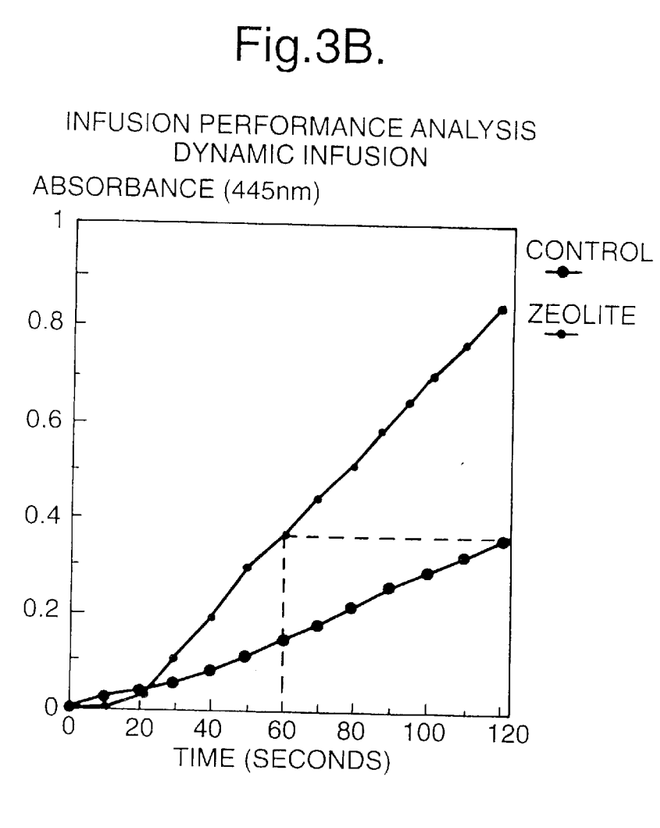

|  | Dynamic | | Static | |
|---|---|---|---|---|
|  | Abs. at 30s | Abs. at 60s | Abs. at 60s | Abs. at 120s |
| Control |  | 2.3834 |  | 0.3619 |
| Zeolite Treated | 2.3454 |  | 0.3702 |  |

The infusion curves of FIG. 3 demonstrate the reduction in brew time that can be achieved by using zeolite treated tea. In a dynamic (mug brew) situation zeolite treated tea produces an infusion equivalent to a 60 second control brew in 31 seconds (ie. just over half the time). In a static (pot brew) situation, a brew equivalent to 120 seconds in terms of optical density is achieved in 50% of the time (ie. 60 seconds).

EXAMPLE 4

Cold Infusing Leaf Tea

Further experiments, generally similar to those described in Example 2, were carried out to produce cold infusing black leaf tea from green leaf, using different zeolites at different levels. The zeolites used were zeolite 4A (WESSALITH P and DOUCIL P) and zeolite P (CG 180 from Crosfield).

Manufacture

Frozen withered Kenyan leaf stored at −80° C., is CTC treated twice to comminute the leaf. 200 g of the resulting dhool (equivalent to 63 g of black tea) is spread evenly on a stainless steel tray to give a bed thickness of approximately 0.5 cm, and sprayed with 10.0 ml of distilled water containing 100 U of Kikkumen of tannase (equivalently to 2.0 mg). The dhool is mixed by hand after the first 5.0 ml has been applied. The treated dhool is sealed in a plastic bag and the excess air expelled to produce a reduced oxygen environment, before incubation at 20° C. for 30 minutes. After incubation the dhool is transferred to a stainless steel tray and spread out as before 4.0 ml of distilled water containing 0.5 g of zeolite in suspension is sprayed onto the dhool, again with mixing, before a final CTC pass which serves to further comminute the leaf, further distribute the zeolite, and cause the zeolite to be absorbed into the leaf structure. This is approximately equivalent to 1 g of zeolite to 125 g of black leaf tea.

The tannase and zeolite treated leaf is then fermented for 150 minutes at 18° C. with 95% relative humidity to allow the oxidative reactions to take place. The fermented dhool is then fired in a fluid bed dryer using hot air at 125° C. for 6 minutes followed by 80° C. for 8 minutes to produce the final tea product.

Infusion (Loose Leaf)

2.27 g of the tea product is weighed into a conical flask. 200 ml of cold water (17° C.–20° C.; tap or distilled) is poured onto the leaf, and the infusion stirred for 5 minutes at approximately 150 rpm. The resultant liquor is filtered through a Whatman 540 filter paper to remove the spend leaf, which is squeezed to extract residual liquor before discarding. The liquor volume is restored to 200 ml before colour evaluation using Minolta transmittance.

Typical Infusion Results

Effect of Zeolite Type

With distilled water:

| Sample | L-value | a-Value | b-Value | Haze | % Solids | pH |
|---|---|---|---|---|---|---|
| Kenyan Control | 91.25 | −2.77 | 48.82 | 5.0 | 0.184 | 5.40 |
| Tannase (100 U) Treated Kenyan | 88.83 | −2.40 | 67.36 | 7.3 | 0.217 | 5.03 |
| Kenyan - 100 U Tannase & 0.5 g CG180 | 83.75 | 4.88 | 71.34 | 9.5 | 0.224 | 5.27 |
| Kenyan - 100 U Tannase & 0.5 g Wessalith-P | 88.70 | −0.47 | 62.63 | 4.1 | 0.192 | 5.23 |
| Kenyan - 100 U Tannase & 0.5 g Doucil-P | 83.68 | 3.62 | 74.11 | 12.0 | 0.231 | 5.20 |

With tap water:

| Sample | L-value | a-Value | b-Value | Haze | % Solids | pH |
|---|---|---|---|---|---|---|
| Kenyan Control | 89.91 | 1.13 | 28.17 | 4.4 | 0.182 | 6.90 |
| Tannase (100 U) Treated Kenyan | 85.40 | 2.28 | 41.58 | 2.6 | 0.196 | 6.73 |
| Kenyan - 100 U Tannase & 0.5 g CG180 | 82.13 | 8.47 | 47.77 | 3.2 | 0.225 | 6.71 |
| Kenyan - 100 U Tannase & 0.5 g Wessalith-P | 83.95 | 6.78 | 45.00 | 2.9 | 0.217 | 6.67 |
| Kenyan - 100 U Tannase & 0.5 g Doucil-P | 83.07 | 6.90 | 45.87 | 3.2 | 0.213 | 6.69 |

Effect of Amount of Zeolite (WESSALITH-P)

Experiments were carried out using the same, lower (0.05 g) and higher (1.0 g) levels of zeolite. The lower and higher levels of zeolite are approximately equivalent to 1 g of zeolite to 1250 g and 63 g of black leaf tea, respectively.

With distilled water:

| Sample | L-value | a-Value | b-Value | Haze | % Solids | pH |
|---|---|---|---|---|---|---|
| Kenyan Control | 89.75 | 2.78 | 55.09 | 10.3 | 0.226 | 4.96 |
| Tannase (100 U) Treated Kenyan | 87.46 | −1.02 | 73.66 | 12.0 | 0.270 | 4.42 |
| Kenyan 100 U Tannase & 0.05 g Wessalith-P | 84.42 | 2.05 | 81.96 | 14.0 | 0.280 | 4.51 |
| Kenyan - 100 U Tannase & 0.1 g Wessalith-P | 84.18 | 2.13 | 81.91 | 18.0 | 0.281 | 4.54 |
| Kenyan - 100 U Tannase & 0.5 g Wessalith-P | 82.26 | 7.20 | 79.25 | 11.3 | 0.263 | 4.82 |
| Kenyan - 100 U Tannase & 1.0 g Wessalith-P | 74.85 | 19.37 | 72.03 | 13.2 | 0.262 | 5.11 |

With tap water:

| Sample | L-value | a-Value | b-Value | Haze | % Solids | pH |
|---|---|---|---|---|---|---|
| Kenyan Control | 90.34 | 1.18 | 29.96 | 6.4 | 0.198 | 6.78 |
| Tannase (100 U) Treated Kenyan | 83.34 | 7.01 | 56.16 | 6.8 | 0.269 | 6.48 |

-continued

| Sample | L-value | a-Value | b-Value | Haze | % Solids | pH |
|---|---|---|---|---|---|---|
| Kenyan 100 U Tannase & 0.05 g Wessalith-P | 81.38 | 10.46 | 58.84 | 4.7 | 0.264 | 6.44 |
| Kenyan - 100 U Tannase & 0.1 g Wessalith-P | 78.84 | 13.81 | 62.78 | 7.0 | 0.286 | 6.40 |
| Kenyan - 100 U Tannase & 0.5 g Wessalith-P | 76.54 | 18.82 | 54.56 | 5.3 | 0.266 | 6.43 |
| Kenyan - 100 U Tannase & 1.0 g Wessalith-P | 79.04 | 15.11 | 46.58 | 3.9 | 0.250 | 6.58 |

EXAMPLE 5

Conversion of Black Leaf Tea to Powder

Sri Lankan black leaf tea was produced as described in Example 2, and the leaf was then converted to black tea powder. This involved extracting the leaf with water at a water:leaf ratio of 15:1, at a temperature of 80° C. for 2 minutes. Spent leaf and fines were filtered off but not centrifuged. Liquor was freeze dried under standard conditions to produce black tea powder.

Milked liquor was prepared from the powder by addition of boiling demineralised water and whitener (in the form of a commercially available non-dairy creamer known as DP355 from DMV) in the following proportions: 0.4% tea powder and 2.5% whitener in 100 ml of water (further details are given below).

Colour was measured using a 2 mm pathlength as described below.

Milked Tea Liquors - Measurement of Appearance

This method measures colour by reflectance. Tea samples containing milk/whitener are translucent, rather than opaque, so extra care must be exercised in both measuring and interpreting results. The equipment geometry, colour scale, cell path length, observer angle illuminant and colour indices should be appropriate for the investigation or product application. Changes in powder concentration are know to affect the light absorbing/scattering of the liquors in a non-linear way. This method was devised to give reproducible results and the measurements are made at 20° C. not at hot make-up or warm drinking temperature where colour changes are rapid during cooling. Measurement of L, a, b, K/S, opacity, dominant wavelength or excitation purity will not represent the true visual appearance of consumer made samples but will provide good quality comparative data. The use of milk (whole or semi-skimmed) is not recommended, due to batch to batch variation in the protein content and fat cell size distribution, which will have a considerable effect on the results.

Colour Measurement: Standard Method - HunterLab Ultrascan

1. For powder tea, make up a 1.0% dispersion/solution. Dissolve 2.5 g in 50ml of boiling deionised water and cool rapidly. Make up to 250 ml, with deionised water, in a volumetric flask. From this 1% stock solution make up 100 ml of each of the following concentrations: 0.1, 0.2, 0.3, 0.4, 0.5, 0.6%. Add 2.5 gm whitener DP355 to each 100 ml of tea solution. Alternatively add 10 ml of 25% whitener DP355 premade hot and cooled. N.B. results from different whitener methods are not comparable.
2. For whiteners, make up a 25% dispersion/solution. Dissolve 15 gm in 60 ml hot water and cool rapidly. Make up 500 ml of 0.4% tea solution using a standard tea powder as described above e.g. Ceytea 140X. To 100 ml aliquots of the tea solution add whitener solution to give each of the following concentrations 1.5% (6 ml), 2.0% (8 ml), 2.5% (10 ml), 3.0% (12 ml), 3.5% (14 ml). Mix thoroughly. For full fat milk powders of high fat whiteners (>40% fat) add half this amount of whitener dispersion (or use manufacturers recommended level). Alternatively weigh out the correct weight of dry whitener to achieve the desired concentrations, add tea powder (0.4 g), mix and add 30 ml hot deionised water and cool rapidly. Make up to 100 ml in a volumetric flask. N.B. results from different make up methods are not comparable.
3. Measure after 1 hour rest at 20° C.
4. Set Hunterlab Ultrascan to measure with reflectance, specular include (RSIN), D65 illuminant, 10° C. observer angle and opacity procedure.
5. Calibrate/standardize sensor.
6. Pour sample into 2 mm path length cells with black and white backgrounds to within 2 mm of top. Place at reflectance port and take readings. Repeat measurements to give 3 replicates. This data is used for the calculation of all values.
7. Whilst the data once collected may be manipulated and presented in many different ways, there are some conventions which should normally be observed, e.g. L, a, b data should normally only be presented as a 3D plot and K/S value at the dominant wavelength.

Appearance details of the milked liquors are set out in the following table.

| Sample | Milk Liquor Colour | | | Comments |
|---|---|---|---|---|
| | L | a | b | |
| Control | 63.3 | 13.7 | 34.0 | hue angle: 68.1° chroma: 36.7 Yellow and bright with reasonable colour intensity |
| Zeolite | 56.1 | 10.6 | 23.3 | hue angle: 65.5° chroma: 25.6 Very dark and dull. Much less yellow than control |
| Tannase | 66.8 | 12.1 | 34.6 | hue angle: 70.7° chroma: 36.7 Vibrant yellow. Very intense colour |
| Zeolite + Tannase | 53.6 | 11.7 | 20.4 | hue angle: 60.2° chroma: 23.5 Reddest. "Muddy" and dull with pinkish hue |

EXAMPLE 6

Cold Water Soluble Powder from Extraction of Black Leaf Tea

Figure 4:
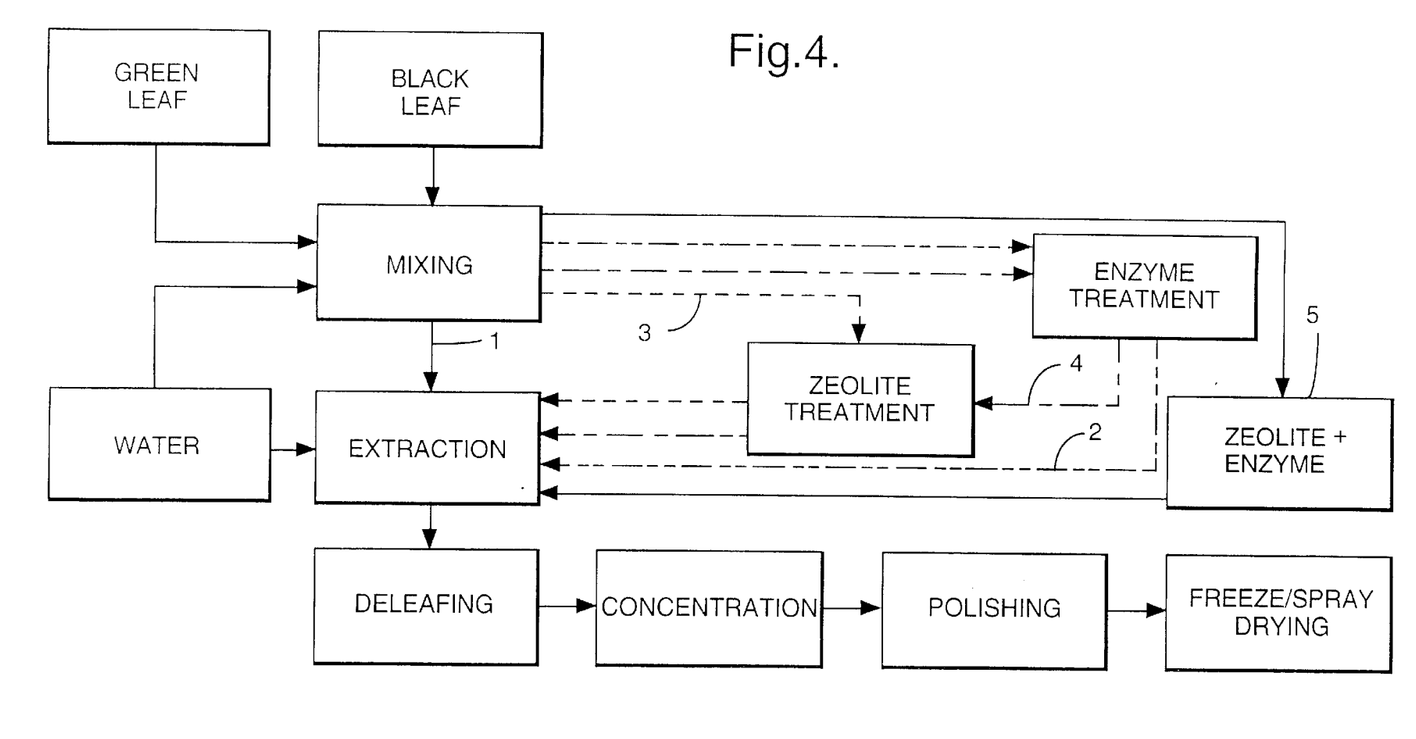
FIG. 4 is a flow chart illustrating an extraction process for manufacture of tea powder from black or green leaf.

Referring to FIG. 4, a conventional extraction process for manufacturing tea powder from green and/or black leaf comprises mixing, extraction through to drying, deleafing, concentrating, polishing and freeze/spray drying steps. Conventional enzyme treatment, eg with carbohydrases and/or tannase, may be carried out prior to extraction. In accordance with the invention, zeolite is added, preferably prior to extraction, after conventional enzyme treatment. An alternative approach would be to use zeolite treated green tea as an ingredient in this process.

A blend of 50:50 Sri Lankan High:Low Grown BMF (Broken Mixed Fannings) was used. Two extraction systems were investigated, one with and the other without, enzymes. The enzyme system and levels used were:

Viscozyme (Ex Novo) at 0.5%

Celluclast 1.5 L (Ex Novo) at 0.25% and

Tannase (ex Kikkoman) 50,000 Tau/g at 0.0064% (as % of leaf wt).

Viscozyme is a multienzyme complex containing a wide range of carbohydrases and is produced from a selected strain of the Aspergillus group. Celluclast is a liquid cellulase preparation made by submerged fermentation of a selected strain of fungus *Trichoderma reesei*.

The process was based on a total water:leaf ratio of 13.5:1 and consisted of two stages:

(i) Incubation stage at 45° C. for 40 minutes, at a water to leaf ratio of 6:1

(ii) Extraction stage at 80° C. for 45 minutes, with the water to leaf ratio increased to 13.5:1.

At this point the final extract is deleafed, cooled and held overnight at +4° C., prior to polishing at 15° C., 10,000 RPM for 20 minutes.

Zeolite 4A (WESSALITH p) additions were investigated at each of the above stages at one or two different levels, ie 1 g of zeolite to 14.3 g of BMF and 1 g of zeolite to 7.15 g of BMF.

Zeolite additions to the deleafed extracts at the same two levels, with and without further heating to 80° C., were also investigated.

The resultant polished extracts from the trials were freeze dried at 25° C. over 2 days.

Colour assessment was carried out on the reconstituted freeze dried tea powders dissolved in 0.02M citrate buffer at 0.32% (w/v) solids concentration, pH 3.7. Measurements were made using a Minolta CT-310 instrument using illuminant C, a 2° observer, a 1 cm pathlength transmission cell, and the results based on CIE 1976 L*a*b colour space.

The results are shown in the table below.

| Sample/Description | Dissolved Powder Colour | | | Z:BMF |
|---|---|---|---|---|
| | L | a | b | |
| 1. Control enzyme-based extraction process. | 90.45 | −3.02 | 45.04 | — |
| 2. Enzyme treatment in presence of zeolite. | 75.10 | +6.34 | 58.04 | 1:14.3 |
| 3. Zeolite addition to extraction mix post enzyme treatment. | 79.35 | +4.27 | 48.45 | 1:14.3 |
| 4. Zeolite addition to extract from enzyme-based process. | 89.16 | −1.98 | 46.80 | 1:7.15 |
| 5. Zeolite addition to extract plus further heating. | 80.09 | +2.53 | 46.91 | 1:14.3 |
| 6. Control conventional hot water extraction process. | 90.84 | −3.28 | 43.77 | — |
| 7. Conventional extraction in presence of zeolite. | 73.52 | +9.14 | 54.68 | 1:14.3 |
| 8. Zeolite addition to hot extract from standard process. | 84.73 | +0.10 | 55.07 | 1:7.15 |

EXAMPLE 7

Part 1 - Combining a tannase and potassium zeolite treatment

Materials

Tannase: 50 KU/g; Kikkoman, Japan

TeazymeC: Multifunctional enzyme. Approximate activities:

Pectin Esterase (800 U/ml)

Polygalacturonase (200 U/g)

Transeliminase (unknown)

Tannase like (120 U/ml)

Zeolite: Potassium Zeolite ($K^+$zeolite); Crosfields.

Tea Leaf Frozen withered leaf; Mabroukie, Kenya.

Withered leaf was comminuted to form dhool by two successive CTC treatments, before spreading the onto a stainless steel tray and spraying with tannase (20 ml aqueous solution containing 100 U of tannase/200 g of dhool). The material was mixed thoroughly by hand and CTC treated to ensure homogenous mixing of the tannase, before fermenting for 75 minutes at 22° C. and 95% relative humidity in an environmental cabinet. The leaf was CTC treated after 35 min of fermentation to further mix the dhool and to improve aeration. The dhool was then spread onto a stainless steel and sprayed with an aqueous suspension of zeolite (0.5 g in 20 ml water/200 g of dhool), with mixing by hand to ensure an even coverage. The mixture was CTC treated a final time to mix and incorporate the zeolite before fermenting for 120 min at 22° C. and 95% relative humidity. The dhool was then fired and the black tea graded to give a leaf size between 0.355 and 1.18 mm before infusion.

Infusion 2.27 g of leaf was weighed into a 250 ml conical flask. 200 ml of cold deionised water was added and the suspension stirred for 5 minutes. The spent leaf was removed by filtration and the liquor made up to 200 ml with cold tap water in a volumetric flask. Liquor colour parameters (L a, b, and haze) were measured using the HunterLab, together with the pH and the % soluble solids.

Part 2 - Combining teazyme C and potassium zeolite treatment

The leaf manufacture was identical to Part 1 except that the tannase was replaced with a 20 ml aqueous solution containing 0.1 ml teazyme C/200 g of dhool. Liquor preparation and analysis were identical.

Results after cold deionised water infusion

| Sample Treatment | L-value | a-value | b-value | Haze | pH | % solids |
|---|---|---|---|---|---|---|
| Control | 88.51 | −0.63 | 66.13 | 11.53 | 5.35 | 0.23 |
| Tannase & $K^+$zeolite | 78.80 | 13.92 | 81.54 | 28.53 | 5.49 | 0.25 |
| TeazymeC & $K^+$zeolite | 82.66 | 8.73 | 70.02 | 17.57 | 5.38 | 0.24 |

Both systems result in a considerable improvement in cold water infusion performance in the black tea product.

We claim:

1. A method of manufacturing a black leaf tea product derived from green tea leaves, comprising: macerating green tea leaves to give a green leaf macerate; fermenting said green leaf macerate to give a fermented tea material; adding zeolite before or during either or both of said macerating and fermenting steps in an amount for reaction with tea ingredients present or subsequently produced to generate red color species, and drying the fermented tea material to yield the black leaf tea product.

2. A method according to claim 1, wherein the black leaf tea product is processed to produce a black tea powder.

3. A method of enhancing the color of a black leaf tea product derived from green tea leaves, characterized by adding zeolite to green leaf or green leaf-derived material during black tea manufacture, said zeolite reacting with tea ingredients present or subsequently produced to generate red color species.

4. A method according to claim 1, wherein the zeolite is a synthetic zeolite.

5. A method according to claim 1, wherein the zeolite has a ratio of Si:Al of 2:1 or less.

6. A method according to claim 1, wherein the zeolite is a sodium, potassium, calcium or magnesium zeolite, or mixtures thereof.

7. A method according to claim 1, wherein the zeolite is a 4A sodium zeolite or a 3A potassium zeolite.

8. A method according to claim 1, wherein zeolite is added at a level of at least 0.05% by weight based on initial dry weight of tea leaf.

9. A method according to claim 1, wherein an acyl-hydrolase is added to increase the rate at which said red color species are liberated from the tea.

10. A method according to claim 9 wherein the acyl-hydrolase is selected from the group consisting of tannase and Teazyme C.

11. A method according to claim 1, wherein the zeolite has a ratio of Si:Al of 1:1.

* * * * *